US012591760B2

(12) United States Patent
Mohanty et al.

(10) Patent No.: US 12,591,760 B2
(45) Date of Patent: Mar. 31, 2026

(54) CROSS-INSTANCE INTELLIGENT RESOURCE POOLING FOR DISPARATE DATABASES IN CLOUD NATIVE ENVIRONMENT

(71) Applicant: Dell Products L.P., Round Rock, TX (US)

(72) Inventors: Bijan Kumar Mohanty, Austin, TX (US); Hung Dinh, Austin, TX (US); David J. Linsey, Marietta, GA (US)

(73) Assignee: Dell Products L.P., Round Rock, TX (US)

( * ) Notice: Subject to any disclaimer, the term of this patent is extended or adjusted under 35 U.S.C. 154(b) by 361 days.

(21) Appl. No.: 18/365,513

(22) Filed: Aug. 4, 2023

(65) Prior Publication Data

US 2025/0045558 A1      Feb. 6, 2025

(51) Int. Cl.
| | |
|---|---|
| *G06F 9/50* | (2006.01) |
| *G06F 16/21* | (2019.01) |
| *G06F 16/27* | (2019.01) |
| *G06N 3/04* | (2023.01) |
| *G06N 3/084* | (2023.01) |

(52) U.S. Cl.
CPC ............. *G06N 3/04* (2013.01); *G06F 9/5083* (2013.01); *G06F 16/219* (2019.01); *G06F 16/27* (2019.01); *G06N 3/084* (2013.01)

(58) Field of Classification Search
CPC ........ G06N 3/04; G06N 3/084; G06F 9/5083; G06F 16/219; G06F 16/27
See application file for complete search history.

(56) References Cited

U.S. PATENT DOCUMENTS

| | | | | |
|---|---|---|---|---|
| 9,547,486 | B2 * | 1/2017 | Huang | ..................... G06F 8/63 |
| 10,833,959 | B2 * | 11/2020 | Barghouthi | ........... H04L 67/125 |
| 2016/0164980 | A1 * | 6/2016 | Kulkarni | .................. G06F 9/44 |
| | | | | 707/770 |
| 2022/0156286 | A1 * | 5/2022 | Obembe | ................. G06F 16/27 |
| 2022/0222231 | A1 * | 7/2022 | Dong | .................. G06F 16/2457 |
| 2024/0202247 | A1 * | 6/2024 | Kobayashi | .......... G06F 16/9024 |

* cited by examiner

*Primary Examiner* — Dong U Kim
(74) *Attorney, Agent, or Firm* — Workman Nydegger

(57) ABSTRACT

One example method includes instantiating an ambassador component in a cloud computing environment that comprises container instances and databases, accessing, by the ambassador component, a prediction as to a number of database connections expected to be used by a particular one of the container instances, and the prediction was generated by a prediction engine, receiving, by the ambassador component, a request from the particular container instance for access to one of the databases, and providing, by the ambassador component to the particular container instance from which the request for access was received, an access object usable by that particular container instance to use a database connection to access the database identified in the request.

20 Claims, 11 Drawing Sheets

200

| Date Time | Microservice Name | Deployed on Instance (Cont/VM) | Database | Database Type | Total Number Active Connections |
|---|---|---|---|---|---|
| | | | | | Target |
| 2021-01-26-16:53:03 | get_customer | Container | ODB1234 | Oracle | 5 |
| 2021-01-26-16:50:03 | get_price | VM | PG2345 | PostGres | 7 |
| 2021-01-26-16:50:03 | update_product | Container | SQLSVR007 | SQLServer | 12 |
| 2021-01-26-16:55:03 | get_customer | Container | ODB1234 | Oracle | 3 |
| 2021-01-26-16:55:03 | get_price | VM | PG2345 | PostGres | 15 |
| 2021-01-26-16:55:03 | update_product | Container | SQLSVR007 | SQLServer | 5 |

```
%matplotlib inline
import pandas as pd
import numpy as np
import matplotlib.pyplot as plt
import seaborn as sns
from sklearn.model_selection import train_test_split
from sklearn.metrics import mean_squared_error import tensorflow.keras as keras
from tensorflow.keras.layers import Dense reading the historical data file into pandas dataframe
connection_df = pd.read_csv("batch_jobe_execution_outcome.csv") # Read the historical, Database utitization data
```

```
# Encode the categorical values by using Label Encoding
from sklearn.preprocessing import LabelEncoder connection_df['microservice_name'] = LabelEncoder().fit_transform(connection_df['microservice_name'])
connection_df['database_name'] = LabelEncoder().fit_transform(connection_df['database_name'])
connection_df['database_type'] = LabelEncoder().fit_transform(connection_df['database_type'])
connection_df['host_type'] = LabelEncoder().fit_transform(connection_df['host_type'])
```

FIG. 5

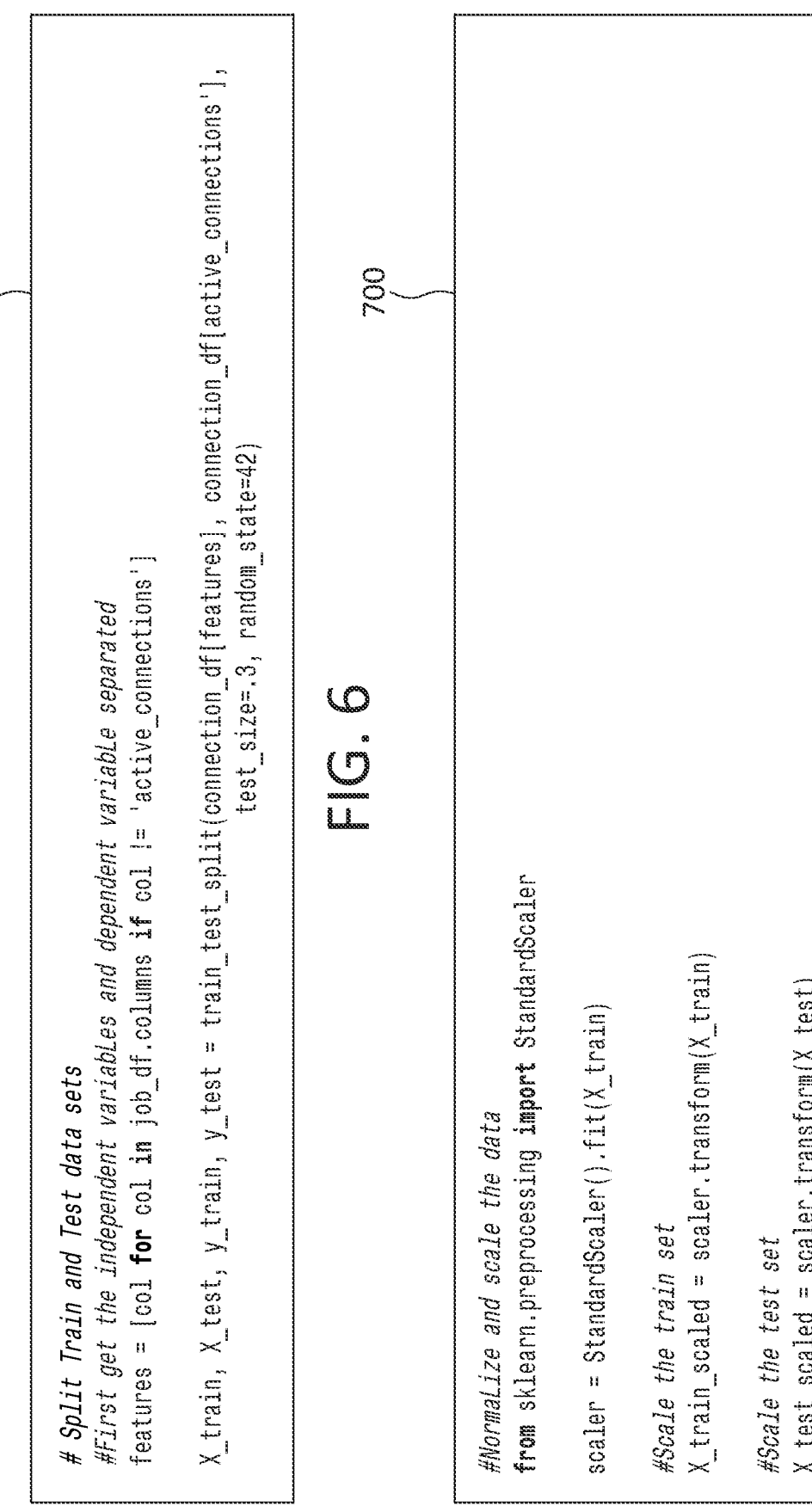

```
# Split Train and Test data sets
#First get the independent variables and dependent variable separated
features = [col for col in job_df.columns if col != 'active_connections']

X_train, X_test, y_train, y_test = train_test_split(connection_df[features], connection_df['active_connections'],
                                                    test_size=.3, random_state=42)
```

```
#Normalize and scale the data
from sklearn.preprocessing import StandardScaler scaler = StandardScaler().fit(X_train)

Scale the train set
X_train_scaled = scaler.transform(X_train)

#Scale the test set
X_test_scaled = scaler.transform(X_test)
```

```
Using TensorFlow Keras to create the Dense Neural Network model for Regression from tensorflow.keras import sequential
from tensorflow.keras.layers import Dense

# Initialize the constructor
model = Sequential()

# Add an first hidden Layer for the 19 input variables
model.add(Dense(32, input_shape = (19,), activation='relu', kernel_initializer='normal'))

# second hidden Layer
model.add(Dense(16, activation='relu', kernel_initializer='normal'))

# Add an output Layer with one neuron and no activation
model.add(Dense(1))

# set the Loss function and optimizer
model.compile(loss='mean_squared_error', optimizer=optimizer, metrics = ['mae', 'mse'])
```

```
# Train the model with the training data
history = model.fit(X_trainScaled, y_train.values, validation_split=0.2,
                    epochs=100, batch_size=500, verbose=1)

# Evaluate the Loss value of the model using Test data
loss = model.evaluate(X_testScaled, y_test, verbose=False)

# Predict the number of days for onboarding customer from the model
y_predict = model.predict(X_testScaled)
```

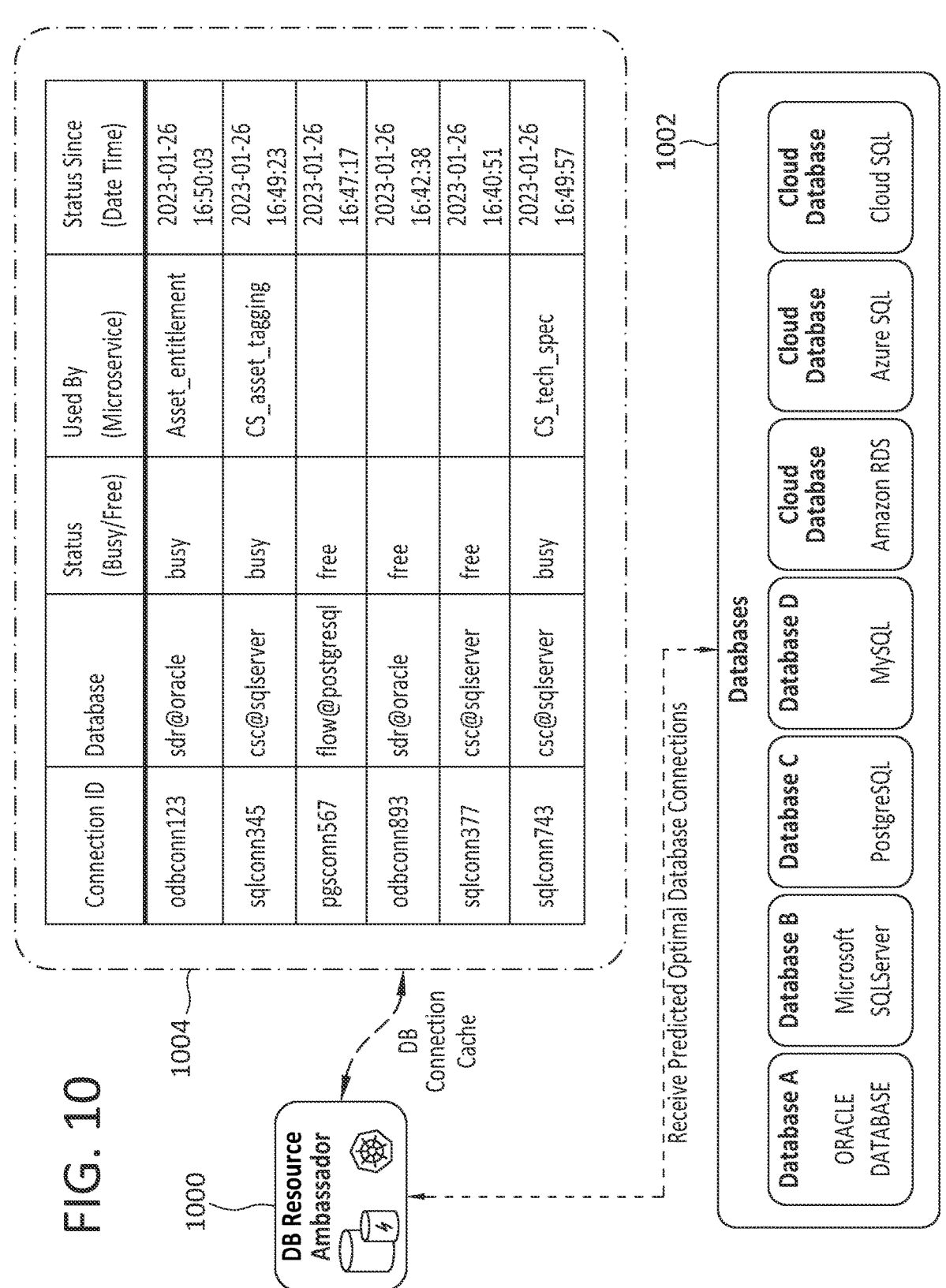

| Connection ID | Database | Status (Busy/Free) | Used By (Microservice) | Status Since (Date Time) |
|---|---|---|---|---|
| odbconn123 | sdr@oracle | busy | Asset_entitlement | 2023-01-26 16:50:03 |
| sqlconn345 | csc@sqlserver | busy | CS_asset_tagging | 2023-01-26 16:49:23 |
| pgsconn567 | flow@postgresql | free | | 2023-01-26 16:47:17 |
| odbconn893 | sdr@oracle | free | | 2023-01-26 16:42:38 |
| sqlconn377 | csc@sqlserver | free | | 2023-01-26 16:40:51 |
| sqlconn743 | csc@sqlserver | busy | CS_tech_spec | 2023-01-26 16:49:57 |

1004

1000

DB Resource Ambassador

DB Connection Cache

Receive Predicted Optimal Database Connections

1002

Databases

| Database A | Database B | Database C | Database D | Cloud Database | Cloud Database | Cloud Database |
|---|---|---|---|---|---|---|
| ORACLE DATABASE | Microsoft SQLServer | PostgreSQL | MySQL | Amazon RDS | Azure SQL | Cloud SQL |

1300

CROSS-INSTANCE INTELLIGENT RESOURCE POOLING FOR DISPARATE DATABASES IN CLOUD NATIVE ENVIRONMENT

FIELD OF THE INVENTION

Embodiments of the present invention generally relate to database access management. More particularly, at least some embodiments of the invention relate to systems, hardware, software, computer-readable media, and methods, for using historical information as a basis to optimize database usage.

BACKGROUND

Modern software development is heavily focused on cloud-native deployments of increasingly smaller and smaller applications. Whether it is deployable software application containing one or more capabilities, such as workflows, or API (application program interface) endpoints for example, or all the way down to a function as a service (FaaS) which performs one discrete action, the complexity of monolithic applications is being tackled head-on in this new paradigm.

It is often said the cloud is "somebody else's computer," and it is all too easy for software engineers to treat cloud platforms as an unlimited resource. Micro-application, or function, proliferation and features such as auto-scaling provide new challenges for engineers and platforms to predict and manage physical and resource-constrained aspects within these cloud environments.

Data source connections, such as to a database, are one of the more common examples where environments, such as cloud environments, can run into a finite resource limit. In particular, while application layers can, in many cases, scale nearly infinitely, databases that serve those application layers typically have a finite limit of the number of concurrent connections they can have open.

For example, a cloud environment hosting a multitude of microservices can connect to many different databases. While there are many database connection pools that may be available for most databases, the capabilities of these connection pools to grow and shrink connections to databases are very similar, using a static approach. That is, while application instances are readily scalable, both up and down, database connection pools to be used by those application instances are quite limited in terms of their ability to scale, and typically only do so within a defined limit.

For example, in AWS (Amazon web services), a RDS (relational database service) proxy that provides connection pooling to relational databases like Aurora or MySQL, uses a minimum pool size, maximum pool size, inactive connection percent such that, for example, if there is no activity in the database connection for five minutes or longer, the database connection is marked as inactive. Similar static settings are available for both the Azure SQL proxy and Cloud SQL Proxy for Google Cloud Platform. In these various examples, connections to the databases are managed by the values contained in a static attributes set.

In more detail, and due to the static values of attributes relating to databases in a DB (database) connection pool including the connection pool sizes and inactive connection percent, typical approaches may be able to manage the database connections to some extent, but cannot prevent resource wastage due to inactive connections. Connection pools are not the only pre-allocated, finite resource challenged in a cloud environment. Resources such sockets are also limited on the physical machine which is ultimately hosting applications. Thus, a too trusting and simplistic approach of pre-allocation of resources based on the specific request by an application instance may, and often does, result in early exhaustion and inefficient usage of these resources, resulting in early expansion of cloud hosting platforms, which wastes time and money.

Further, typical approaches to DB connection pooling do not enable the shared use of a database between two instances of the same application, such as a microservice, in containers. Rather, even if a connection is idle, that connection cannot be used by another instance and the connection pool will return another connection to the same database which fundamentally wastes resources.

Finally, there is a lack of intelligence in resource allocation implemented by conventional approaches. For example, existing DB connection management approaches lack intelligence in the resource allocation or provisioning. Choosing an appropriate set of pre-configure resource flavors is challenging, at least because system administrators must try to keep up with the demand and utilization of resources not only for one team of data practitioners, but for a much larger team.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 2 discloses aspects of some example data elements that may be used to train a prediction engine according to one example embodiment.

FIG. 4 discloses example code for data pre-processing according to one example embodiment.

FIG. 5 discloses example code for encoding categorical values according to one example embodiment.

FIG. 6 discloses example code for splitting datasets according to one example embodiment.

FIG. 7 discloses example code for normalizing and scaling data according to one example embodiment.

FIG. 8 discloses example code for creating a DANN according to one example embodiment.

FIG. 9 discloses example code for training a prediction model according to one example embodiment.

FIG. 10 discloses aspects of a DB resource ambassador according to one example embodiment.

DETAILED DESCRIPTION OF SOME EXAMPLE EMBODIMENTS

Figure 1:
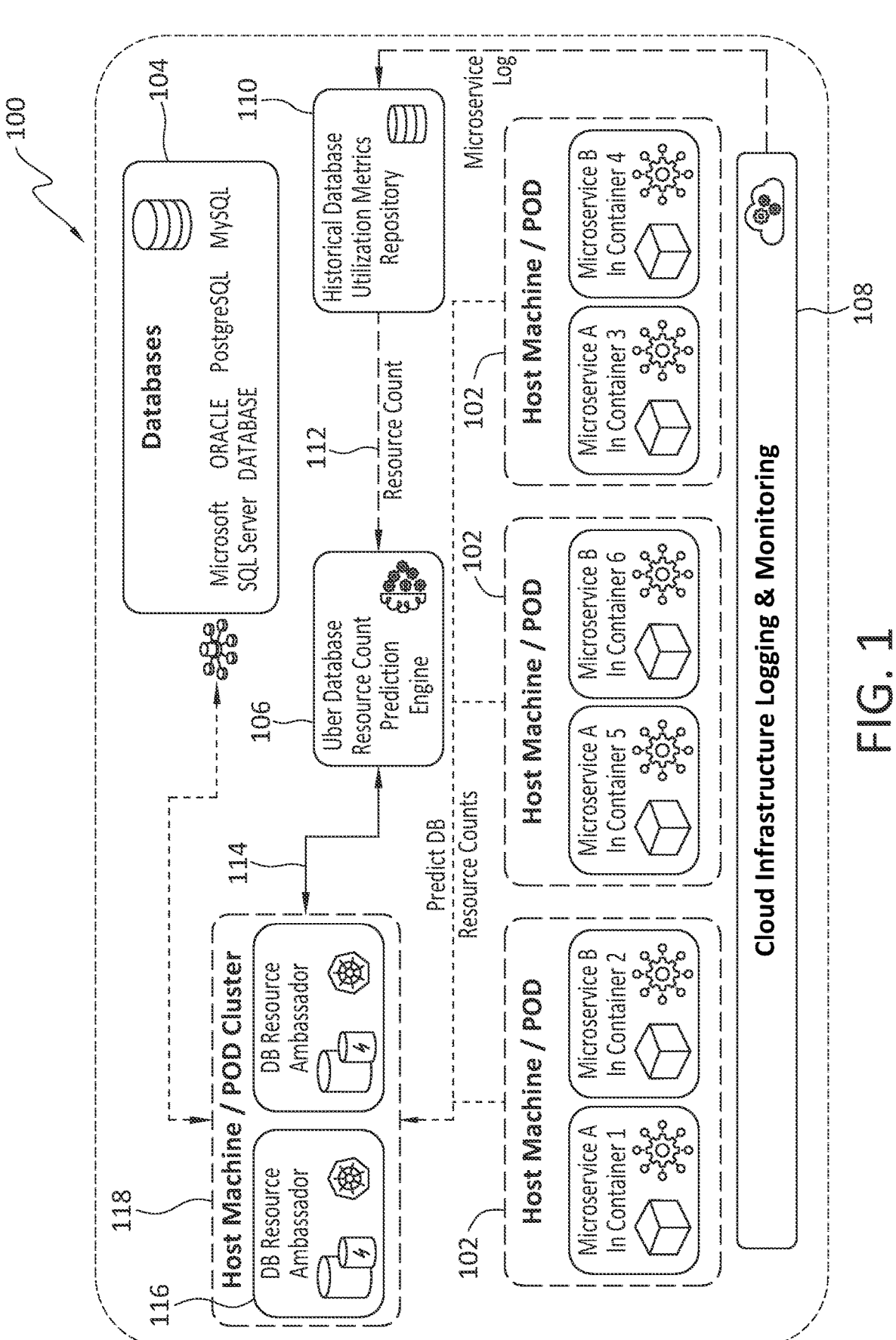
FIG. 1 discloses aspects of a system architecture according to one example embodiment.

Embodiments of the present invention generally relate to database access management. More particularly, at least some embodiments of the invention relate to systems, hardware, software, computer-readable media, and methods, for using historical information as a basis to optimize database usage.

Cloud application modules, such as containers, application instances, and functions, for example, often over-request certain finite resources from the underlying hosting platform and environment. Such resources may include, for example, physical system resources from the host such as sockets or other resources such as database connections. These application modules often internally pool these exact same resources in isolation, and therefore this results in wasted provisioning within the underlying shared platform, leading to premature exhaustion of these resources and unnecessary increased cost to expand the capabilities of the underlying platform.

By intercepting requests from deployed cloud application modules for reservation and allocation of these finite resources, a cloud container resource ambassador or simply 'resource ambassador,' according to one example embodiment of the invention may intelligently distribute real, and virtual, representations of these resources to cloud application modules, resulting in a higher percentage of actual active usage of these resources in a transparent manner. By looking at a past patterns of the actual usage of such resources, an embodiment of the invention may determine the anticipated actual active usage and anticipated actual inactive usage, or waste, of the allocated shared resource(s).

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an example embodiment of the invention is that unnecessary build-out of cloud site resources, including databases, may be reduced or avoided. As another example, an embodiment may provide more efficient use of cloud site resources, such as databases. Further, an example embodiment may reduce or eliminate reservation of resources that are not actually being used. Various other advantages of one or more embodiments of the invention will be apparent from this disclosure.

A. Comparative Hypothetical Examples

Following is a discussion of various, hypothetical, examples for the purposes of illustrating, such as by way of comparison, various aspects of an example embodiment of the invention. These examples are not intended to limit the scope of the invention in any way.

Consider an application A1 which requires connectivity to database D1. This application may be set to have a minimum connection pool size of 4, which can grow to 8 as needs arise. As application A1 is deployed in an auto-scaling cloud environment, for example, the number of instances of application A1 can scale up as well. Consider D1 has a maximum total number of connections at 30. At every step of the scaling, only a fraction of the actual provisioned connections are used in the application. The information in Table 1, below, illustrates how the number of minimum connections opened to the D1 database scale as the application scales.

TABLE 1

| (single application scaling with database connections) | | | | |
|---|---|---|---|---|
| Application deployable | Minimum D1 connection pool size | Number of running instances | Total minimum number of connections to D1 across all instances | Percentage of connections actively being used |
| A1 | 4 | 1 | 4 | 70% |
| A1 | 4 | 2 | 8 | 60% |
| A1 | 4 | 4 | 16 | 60% |
| A1 | 4 | 8 | 32 | 50% |

Once the fourth instance of application A1 spins up, the number of allowed connections to D1, that is, 30, will be exceeded (now 32) and errors will occur. However, this does not mean that 30+ connections to D1 are being used across all instances. Rather this means only that 30+ connections have been opened and reserved across the 4 instances. In this example, only 50% of those 32 connections are being actively used at any point in time. The remining connections are idle within the individual application. However, because there is no visibility of this resource utilization across each application instance, and the resources for each application instance are treated individually in isolation, waste occurs, and engineers may be tempted to invest in scaling out the database D1 by increasing connection pool size when, in fact, the database is not actually being fully utilized. This is a waste of time and money since database expansion and access decisions are being made based on the number of database connections reserved, rather than being based on the number of database connections actually being used.

This resource waste issue may be exacerbated when different applications require the same resource, such as connection to the same database, and/or when different applications require connections to disparate databases. As applications are decomposed into smaller and smaller components, multiple applications may also require access to the same resource, such as connection to the same database, or different databases. Assuming two applications A1 (minimum pool size 4) and A2 (minimum pool size 2), the situation indicated in Table 2 below may arise.

TABLE 2

| | | | Total minimum number of connections to D1 across all application instances | Percentage of connections actively being used |
|---|---|---|---|---|
| Application deployable | Minimum D1 connection pool size | Number of running instances | | |
| A1 | 4 | 1 | 6 | 70% |
| A2 | 2 | 1 | | |
| A1 | 4 | 2 | 10 | 60% |
| A2 | 2 | 2 | | |
| A1 | 4 | 4 | 20 | 60% |
| A2 | 2 | 2 | | |
| A1 | 4 | 8 | 38 | 50% |
| A2 | 2 | 3 | | |

(multiple application scaling with database connections)

As in the case of Table 1, once 30 connections to D1 are reached, the maximum number of allowed connections is reached, and errors will occur when attempting to provision additional connections as instances scale across either application, despite the fact when that limit is reached in the final scaling example, only 50% of the 38 connections are actually in use, and thus the resource is not actually exhausted when viewed from the perspective of connections actually in use, rather than from the perspective of connections reserved.

Note these applications A1 and A2 may not necessarily scale together in parallel, and ultimately will end up competing for these finite resources not only across their running instances, but across application deployable as well.

TABLE 3

(single application scaling with database connections)

| Appl. Deploy. | Min. D1 conn. pool size | # of running inst. | Total minimum number of connections to D1 across all instances | Predicted % of conns. actively being used | Number of real conns. allocated to D1 across all instances | Number of virtual conns. allocated to D1 across all instances | % of real conns. actively being used |
|---|---|---|---|---|---|---|---|
| A1 | 4 | 1 | 4 | 70% | 3 | 1 | 93% |
| A1 | 4 | 2 | 8 | 60% | 5 | 3 | 96% |
| A1 | 4 | 4 | 16 | 60% | 10 | 6 | 96% |
| A1 | 4 | 8 | 32 | 50% | 16 | 16 | 100% |

With reference now to the example of Table 3, the following calculations may be evident/performed:

<Math performed: 70%*4=2.8, round up=3 connections needed, 1 virtual. 2.8/3 (average usage)=93%; in contrast, a conventional approach to database connections would have exhausted all the DB connections in spinning up instance 4 (exceeding the hypothetical 30 limit in the example), but now at instance 4 spin up, an embodiment may only allocate 16 real connections, resulting in no errors, and leaving capacity for additional database connections in the future>

B. Overview of an Example Embodiment

One example embodiment of the invention comprises an intelligent approach to manage resources, such as DB connections for example, in an environment, such as a cloud environment for example, to share and allocate connections to microservices in containers based on a variety of heuristics and one or more ML (machine learning) models. Thus, an embodiment comprises the creation and use of a DB resource ambassador that manages open connections to disparate databases and allocates applicable, unused connection when a microservice needs to connect to the database. By residing within a physical host system, and intercepting and brokering these finite, shared, resources of multiple databases across the requests of individual application instances, an embodiment of the DB resource ambassador can optimize the resource utilization. Unlike existing technologies which provision and allocate resources based what is asked up to the hard limit available on the system, the resource ambassador can intelligently provision these finite resources based on current and historical actual usage such that actual resource usage more closely aligns to allocated resources, thus providing various benefits such as reducing the wasting of resources which may be reserved to an application, but nonetheless, unused.

Note that while reference is made herein to resources such as database connections, such reference is for the purpose of illustration, and the scope of the invention is not limited to database connections. Rather, the invention contemplates and embraces embodiments employed in connection with any other computing environment resources that may be managed and efficiently employed as disclosed herein.

C. Detailed Discussion of an Example Embodiment

An example embodiment of the invention comprises an innovative, intelligent, and predictive framework to estimate the resource sizes, such as database connections, of the microservices, or other resource consumers, hosted in cloud environments. To achieve the prediction on the microservice instance resource sizing, an embodiment of the invention may leverage the historical utilization data, such as database connections for example, of each microservice as captured in the logging systems. This utilization data with timestamp captures the load, volume, seasonality and are an excellent training indicator of the future utilization from a connection perspective. By utilizing an ML algorithm, an embodiment of the invention may predict the size of each resource, such as DB connections for example, for that microservice.

In an embodiment, another capability of this intelligent framework is a smart resource ambassador that may, in an embodiment, be hosted in another container and may act as a router/broker for DB connection requests for the microservices. This smart resource ambassador, or simply 'ambassador,' may keep track of all open connections to all databases for all microservices. As well, the ambassador may keep track of the time elapsed since each connection was used. By using the historical connection utilization metrics and using that historical information to train an ML model, the ambassador may decide which inactive connection, of a group of one or more inactive connections, to use when a request for a DB connection from a microservice is invoked.

C.1 Example Architecture of an Embodiment

With reference now to FIG. 1, an architecture according to one example embodiment of the invention is referenced at 100. It is noted that while containers and Kubernetes POD are shown in FIG. 1, the scope of the invention is not limited to containers, and may extend more broadly to other types of application deployment models including, but not limited to, VMs (virtual machine).

As shown in the example of FIG. 1, the architecture 100, part, or all, of which may be implemented in a cloud computing environment, may comprise various host machines/PODs 102, such as microservices for example, that require access to various types and numbers of databases 104, examples of which are listed in FIG. 1. To enable efficient access to, and use of, the databases 104 and, particularly, the database 104 connections, the architecture 100 may comprise an 'Uber Database Resource Count Prediction Engine,' also referred to herein simply as a 'prediction engine' 106, that may generate predictions and estimates as to an optimal value of resources, such as database 104 connections, for a microservice. In general, the prediction engine 106 may be trained using historical information, such as data and metadata, logged by a logging entity 108 and stored in a Historical 'Database Utilization Metrics Repository,' also referred to herein simply as a 'historical metrics repository.' Thus, as shown in FIG. 1, the historical information may be provided as training data 112 to the prediction engine 106. When the prediction engine 106 has been trained, it may use information, such as real time information, concerning database 104 connections to estimate an optimal number of database connections needed by a customer, or customers, such as one or more containers for example. The predictions 114 generated by the prediction engine 106 may be passed to a 'DB Resource Ambassador' or simply an 'ambassador' 116. In an embodiment, one or more instances of the ambassador 116 may reside in in a cluster 118 together with one or more host machine/PODs 102. The ambassador 116 may use the predictions 114 to enable connections between the host machine/PODs 102 and the databases 104. Further details concerning components of the example architecture 100 are provided hereafter.

C.2 Historical Database Resource Utilization Repository

Microservices deployed in containers or virtual machines may use databases for CRUD (create, read, update, delete) operations. One approach for connecting to a database is by leveraging a connection pool. Oftentimes, DB connections are resources which are sporadically used. For example, the DB connections may be idle for a time, and may then be automatically closed based on a configurable inactivity timeout value. In an embodiment, all of these connections and their type of databases, along with active and inactive times, may be logged for each microservices, and this logged information may be used to enable insightful decisions in optimizing the use of these DB resources. Further, as the load on any application, including containerized applications, may vary based on day and time, as well as on a seasonal basis, the activities of the DB resources needed and used by the applications can vary accordingly as well. This logging may be performed, for example, by a logging system in a cloud native environment, or by legacy applications, so as to capture the database activities including date-time, how many connections, what databases were connected to by the applications, as well as application activity metrics such as whether the applications and/or their database connections are active or inactive.

Thus, an embodiment of the invention utilizes this log data, such as for each instance of a microservice, of the databases connected to, or not, by the instances, and the microservice resource utilization, in a repository for training a prediction engine to generate a smart prediction of a number or resource/connection counts for a given instance of a microservice. As a cloud environment may host many microservices, and potentially connections to many databases, this repository will store metrics of multiple microservices and their connections to multiple databases. Some example data elements that may be stored in this repository and used for training the model are disclosed in the table 200 of FIG. 2.

As shown in the table 200, information that may be used to train an ML model may include, but are not limited to 'Date/Time,' 'Microservice Name,' 'Deployed on Instance (Cont/VM)' (that is, where the instance is deployed), 'Database' to which the microservice is connected, and the 'Database Type.' These various inputs and/or other inputs may be used by the ML model to generate a 'Target' value prediction such as the 'Total Number of Active Connections' expected to be needed by a particular instance of a microservice.

C.3 Example Prediction Engine

In an embodiment, a prediction engine, an example of which is referenced at 106 in FIG. 1, may operate to estimate/predict the optimal value of the resources, such as database connections, needed by a particular instance of microservice. An embodiment of the prediction engine comprises a regression-based ML algorithm, or simply 'model,' to predict the size of resources/connections to various databases. Historical utilization metrics of the microservices and their database connection metrics are harvested from monitoring and logging systems in the cloud and/or elsewhere. In an embodiment, these metrics include such as, but not limited to, date/time, microservice name, database name, database type, and % active, that, the percentage of time that a reserved database connection is actively being used. These historical metrics data may be used to train the regression-based ML model of the prediction engine.

In an embodiment, the prediction engine employs a supervised learning mechanism and trains the regression-based ML model with the historical data containing the actual connection metrics to each database for each microservice. The important features are extracted from the dataset and may include, for example, the date-time, microservice name, container id, database being connected, type of database, and the activity status of the connection, and/or other features that are influential in impacting the number of database connections being created for one or more microservice instances. During the training of the regression-based ML model, these features are fed into the regression-based ML model as the independent variables, and the number of connections to the database in the dataset as the dependent/target value, as shown in the example table 200. While creating the database resource management ambassador component, the predicted number of resource/connection count is used to generate, track and reuse the connections, thus minimizing wasteful connections which, while they may be reserved, are not actively used.

Figure 3:
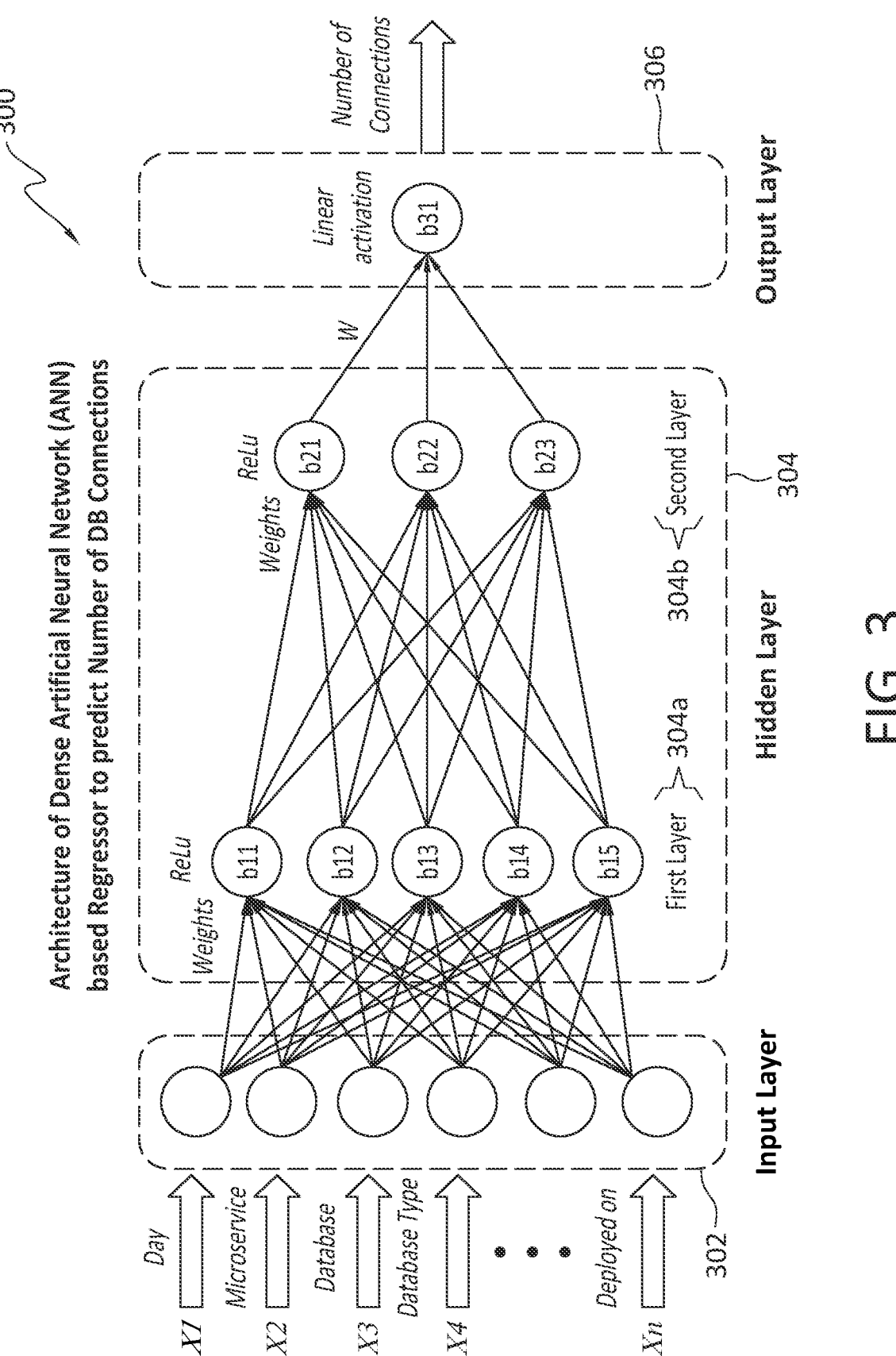
FIG. 3 discloses aspects of an example DANN (dense artificial neural network) according to one example embodiment.

In an embodiment, the prediction engine may comprise a DANN, an example of which is referenced at 300 in FIG. 3, that is constructed as a dense, multi-layer neural network which acts as a regressor. The DANN 300 may comprise an input layer 3092, one or more hidden layers 304, and an output layer 306. In one particular embodiment, there are two (2) hidden layers, namely a first hidden layer 304*a* and a second hidden layer 304*b*. The example input layer 302 comprises a number of neurons that matches the number of input/independent variables (see table 200 for some example input/independent variables). The number of neurons on each of the two hidden layers 304 layer depends upon the number of neurons in the input layer 302. In an embodiment, the output layer 306 contains just a single neuron as an example embodiment of the invention comprises a regression model, meaning that the output is a continuous, numerical value representing the number of database connections expected to be needed by a microservice, or other consumer of resources such as database connections.

Note that although there are five neurons/nodes shown in the first hidden layer 304*a* and three neurons/nodes shown in the second hidden layer 304*b*, the actual values depend upon the total number of neurons in the input layer 302. Typically, the neurons in the hidden layers 304*a* and 304*b* and output layer 306 contain an activation function which drives whether a neuron will fire or not. In a DANN 300 according to one embodiment, ReLU (Rectified Linear Unit) activation function is used in both the hidden layers 304*a* and 304*b*. As the DANN 300 is configured to behave as a regressor, the output neuron will contain a linear activation function, or no activation function.

As an embodiment of the prediction engine comprises a dense neural network, namely, a DANN 300, the nodes will each connect with each other. Each connection will have a weight factor and the nodes will each have a respective bias factor. These weight and bias values may be set randomly by the DANN and may each be initialized as 1 or 0. In an embodiment, each neuron/node performs a linear calculation by combining the multiplication of each input variables (x1, x2 . . . ) with their weight factors and then adding the bias of the neuron. The formula for this calculation is shown as below.

$$ws1 = x1.w1 + x2.w2 + \ldots + b1$$

where [1] ws1 is the weighted sum of the neuron1, [2] X1, X2 . . . are the input values to the model [3] w1, w2 . . . are the respective weight values applied to the connections to the neuron1, and [4] b1 is the bias value of neuron1.

This weighted sum, ws1 for example, is input to an activation function, such as ReLU for example, to compute the value of the activation function. Similarly, the respective weighted sum and activation function values of all other neurons in the layer are calculated. These values are fed to the neurons of the next layer. The same process is repeated in the next layer neurons until the values are fed to the neuron of the output layer 306. This is where the weighted sum is also calculated and compared to the actual target value. Depending upon the difference, the loss value is calculated. This pass through of the DANN 300 is a forward propagation which calculates the error and drives a backpropagation through the network to minimize the loss or error at each neuron of the network. Since the error/loss is generated by all the neurons in the network, backpropagation goes through each layer from back to forward, that is, 302 to 304*a* to 304*b* to 306, and attempts to minimize the loss by using gradient descent-based optimization mechanism. Further, because the DANN 300 is used as a regressor in this example, an embodiment may use the loss function as "mean_squared_error" and "adam" (adaptive moment estimation) as the optimization algorithm.

The result of this backpropagation is to adjust the weight and bias values at each connection and neuron level to reduce the error/loss. Once all the observations of the training data are passed through the DANN 300, an epoch is completed. Another forward propagation may then be initiated with the adjusted weight and bias values which are considered as epoch2 and the same process of forward and backpropagation is repeated in the subsequent epoch(s). This process of repeating the epochs results in the reduction of loss to a very small number, possibly close to 0, at which point the DANN 300 is sufficiently trained to make accurate predictions as to the number of database connections needed by a microservice instance.

C.3.1 Aspects of an Example Method for Implementing and Using a Prediction Engine In an embodiment, the implementation of a prediction engine can be achieved by using Keras with Tensorflow backend, Python language, Pandas, Numpy and ScikitLearn libraries.

C.3.1.1 Data Pre-Processing

A method according to one embodiment may begin with data pre-processing. For example, a dataset of the of the historical database utilization repository may be read, and a Pandas data frame generated. The data frame may contain all the columns including independent variables, as well as both the dependent/target variable columns, namely, number of containers, compute requirements, and memory size. The initial operation may be to conduct pre-processing of data to handle any null or missing values in the columns. In an embodiment, null/missing values in numerical columns may be replaced by the median value of the values in that column. After performing an initial data analysis by creating univariate and bivariate plots of these columns, the importance and influence of each column may be understood. Columns that have no role or influence on the actual prediction, that is, on the target variable how many database connections are expected to be needed for a given instance of a container, may be dropped. FIG. 4 discloses example code 400 for generating a data frame such as that just described.

C.3.1.2 Encoding

As ML models according to one or more embodiments of the invention may operate using numerical values, textual categorical values in the columns (see FIG. 2, for example) of a dataset may be encoded. For example, values for 'microservice,' 'database,' and 'host type' may be encoded. In an embodiment, the encoding may be performed using code 500 disclosed in FIG. 5, such as LabelEncoder from ScikitLearn library.

C.3.1.3 Dataset Splitting

In an embodiment, a dataset to be used in connection with the generation of predictions as to the number of database connections needed by a container instance may be split into a training dataset, and a testing dataset, using a train_test_split function of ScikitLearn library with 70%-30% split, as shown in the example code 600 of FIG. 6. Since an embodiment may comprise a model that implements a regression use case and a DANN may be used as the model, it is useful to scale the data before passing the data to the model and the scaling, which may be implemented with the example code 700 of FIG. 7, may be performed after the training and testing split is done. This scaling may be achieved, in an embodiment, by passing training and test data to StandardScaler of ScikitLearn library. At the end of these activities, the data may be ready for model training/testing.

C.3.1.4 DANN Model Creation

In an embodiment, an ML model, such as the ML model included in the prediction engine 106 for example, may comprise a multi-layer DANN. In an embodiment, the DANN may be created using Keras library, such as with the example code 800 of FIG. 8. Using the function Sequential ( ) the shell model is created, and then individual layers are added by calling add ( ) function of the model and passing an instance of Dense ( ) to indicate that the model under construction comprises a dense neural network. Thus, all the neurons in each layer will connect with all the neurons of the preceding layer, and all the neurons of the following layer. This Dense ( ) function will accept parameters for number of neuron on that layer, type of activation function used, and if there are any kernel parameters. Multiple hidden layers may be added by calling the same add ( ) function to the model, and the output layer may be added in the same way. Once the model is created, a loss function, optimizer type and validation metrics may be added to the model using the compile ( ) function. In an embodiment, "mean_squared_error" is used as the loss function, "adam" is used the optimizer, and "mse" and "mae" are used as the metrics.

C.3.1.5 Model Training, Validation, Optimization and Prediction

In an embodiment of the invention, DANN model training may be implemented by calling a fit ( ) function of the model and passing training data and number of epochs. FIG. 9 discloses example code 900 for training, and evaluating, a model, and also for directing the model to make a prediction. After the model completes the specified number of epochs, it is trained and ready for validation. The loss/error value can be obtained by calling evaluate ( ) function of the model and passing test data. This loss value indicates how well the model is trained. A higher loss value means the model is not trained enough, so hyperparameter tuning is required. Typically, the number of epochs may be increased to train the model more. Other hyperparameter tuning can be done by changing the loss function, the optimizer algorithm, or even making changes to the neural network architecture by adding more hidden layers. Once the model is fully trained with a reasonable value of loss (as close to 0 as possible), the model is ready to generate predictions. Requesting generation of a prediction by the model may be performed by calling predict ( ) function of the model and passing the independent variables of test data, such as for comparing train versus test, or the real values that need to be predicted to estimate the optimal number of database connections, that is, the target variable, needed by a container instance.

C.4 Example Database Resource Management Ambassador

In an embodiment, the database resource management ambassador, an example of which is referenced at 116 in FIG. 1, determines the optimal number of database connections for each microservice by using a prediction generated by the prediction engine, and the ambassador may also maintain a cache of the database connections in a cluster, in order to withstand the failure of any single container. The ambassador may keep track of each connection to each database, along with the status of the connections as 'active' (in use) or 'inactive' (possibly reserved, but not in use in any case). In an embodiment, the ambassador may also track the time when a connection becomes active when used by a microservice, and when the connection becomes inactive, and the time elapsed between when the connection become active and then became inactive. This status (active/busy, inactive/free) and the time elapsed may be used by the ambassador to determine which connection is the best candidate to be used by a microservice that is requesting a database connection. Further details concerning an example embodiment of an ambassador 1000 are discussed below in connection with FIG. 10.

As shown in FIG. 10, the ambassador 1000, upon creation of the ambassador container(s), may request that the prediction engine (see FIG. 1) generate a prediction as to an optimal value of a number of connections to each database 1002 needed by the microservice(s) served by the database(s) 1002. As noted elsewhere herein, this prediction may be based on a history of connections by that microservice to the database(s) 1002. The DB connections, along with the database(s) to which those connections are made, and the status (busy/free) and time may be cached, locally to the ambassador 1000, in a cache 1004.

With continued reference to the example of FIG. 10, a microservice, or other resource consumer, may use various different databases 1002. For example, while some microservices may use Oracle, other microservices may use SQL Server, Postgres, or any of the cloud databases such as, but not limited to, AWS S3, MS Azure, or Dell Apex, for example.

Figure 11:
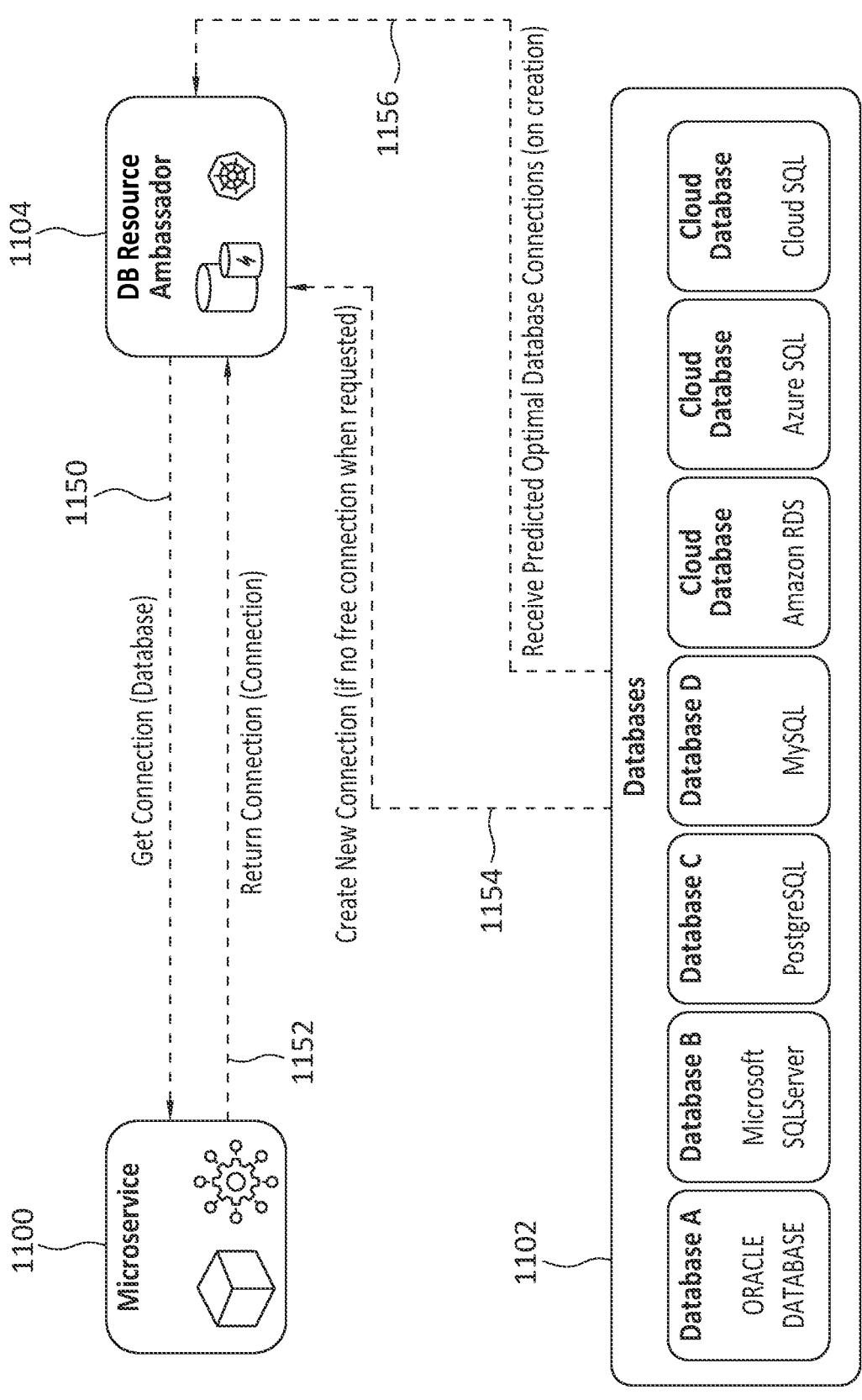
FIG. 11 discloses aspects of interactions between a DB resource ambassador and a microservice according to one example embodiment.

Because the prediction engine (see reference 106 in FIG. 1) may generate predicted, and optimal, values of DB connections to these databases, the responsibility to create microservice database connections is removed from the microservices. Thus, and with reference now to the example of FIG. 11, when a microservice 1100 needs to connect to one or more database(s) 1102, the microservice 1100 may make a request to the ambassador 1104 which finds the available (free) connection(s) from the cache (see 1004 in FIG. 10) and returns 1150 a connection object to the microservice 1100 that enables the microservice 1100 to connect to the requested database(s) 1102.

The status of the connection then changes to 'busy' and the information about [1] the microservice 1100 using the connection and [2] the timestamp are all recorded for that connection in the cache (see 1004 in FIG. 10). When the microservice 1100 is finished with the database 1102 transaction using that connection, the microservice 1100 may call 1152 the return function of the ambassador 1104 for the connection, and the ambassador 1104 may then update the record in the cache for that connection, indicating the connection is free. This update may include timestamping the record to indicate when the connection became free. In one embodiment, the respective timestamps of the free connections may be used, as an input, by an LRU (least recently used) mechanism to return the connection for the next request by the microservice 1100.

In some cases, there may not be any free DB connections available in the cache for a microservice 1100 that needs a connection to one of the databases 1102. In such cases, the ambassador 1104 may make a request to the corresponding connection pool of the databases 1102 to create a new connection, and an object for this new connection may be provided 1154 by the database 1102 to the ambassador 1104. This new connection may be managed in the cache, as in the case of other connections created when the ambassador 1104 is created. For example, when the ambassador 1104 is created, it may automatically receive 1156 one or more predicted optimal database connections. When the microservice 1100 is finished with the database 1102 transaction using that connection, the database 1102 may call a return function of the ambassador 1104 for the connection. The ambassador 1104 may then update the record in the cache for that connection, to indicate that the new connection is free.

If more new connections are created in such a manner, data/metadata concerning the creation of the new connections may be used for training the prediction engine which may, based on this input, predict more connections to that database 1102 for the microservice 1100 in the future. This feedback mechanism may help in sizing the database connections in an intelligent and automated manner.

D. Further Discussion

As apparent from this disclosure, example embodiments of the invention may comprise various useful aspects and features, although no embodiment is required to comprise any of such aspects and features. The following examples are provided by way of illustration.

One example embodiment may comprise a database connection management framework, such as in a cloud computing environment, that is intelligent, and able to handle multiple databases and optimize the availability and use of associated resources, such as database connections. An embodiment may implement an abstraction layer and manage connections to multiple databases with intelligent provisioning and allocation of database connections.

An embodiment may comprise an ML model that is formulated programmatically and, is able to predict, with a high degree of accuracy, the optimal number of DB connection resources needed by a resource consumer such as a container, and which connections are available. These predictions may be made by an ML model that has been trained with historical resource utilization metrics.

As a final example, an embodiment may implement a smart resource ambassador. The ambassador may operate to keep track of the state of all connections to all databases for all microservices, and may automatically handle the provisioning and allocation of resources, such as DB connections, thus seamlessly handling underlying database connectivity for the microservices.

E. Example Methods

Figure 12:
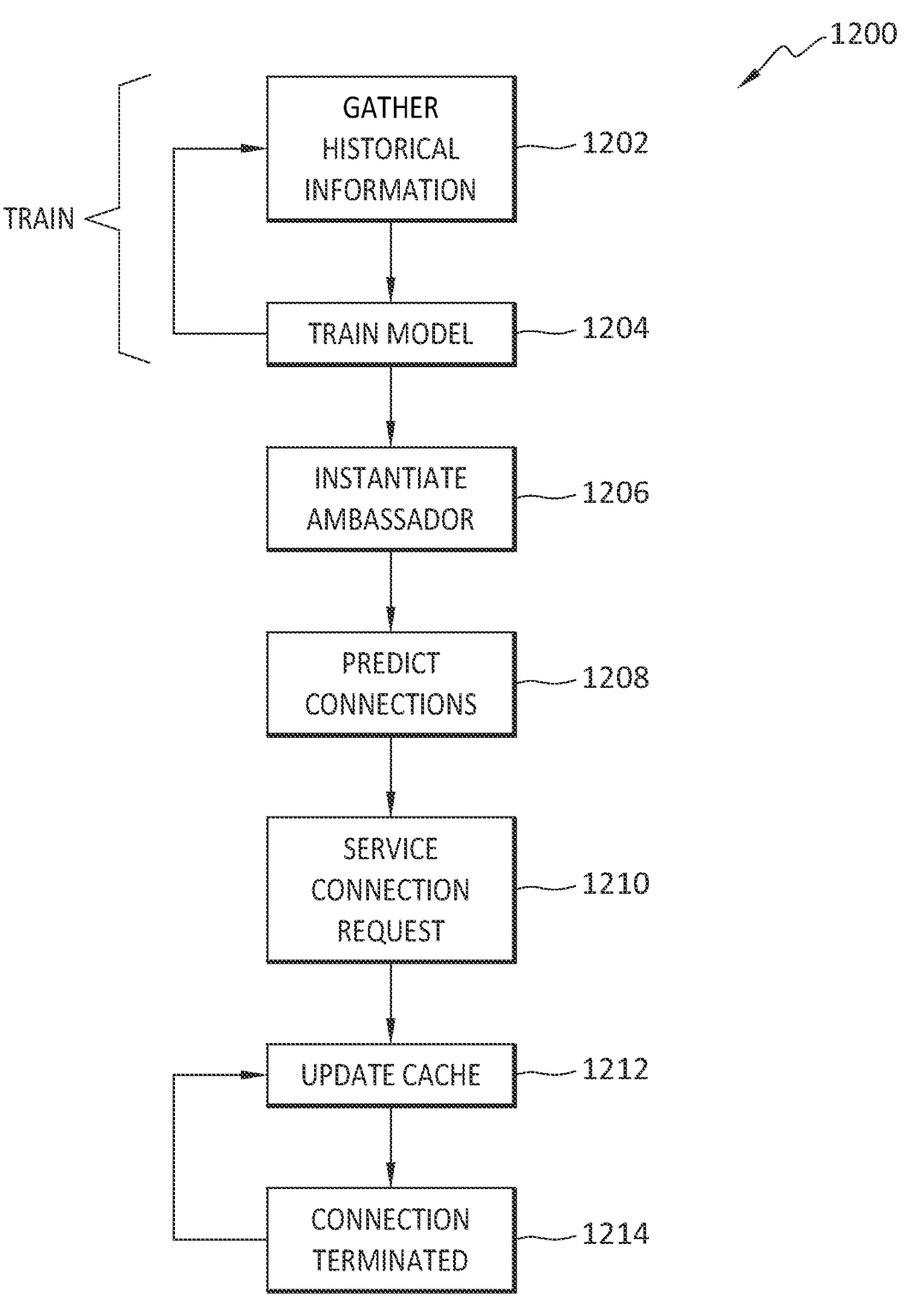
FIG. 12 discloses aspects of a method according to one example embodiment.

It is noted with respect to the disclosed methods, including the example method of FIG. 12, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 12, a method according to one example embodiment is referenced at 1200. In an embodiment, the method 1200 may comprise a training phase, which may be performed at a different time than other operations of the method 1200. In an embodiment, part or all of the method 1200 may be performed cooperatively by an ambassador and a prediction engine that has access to a database of historical information about database connections used by one or more instances of a container. No particular functional allocation is necessarily required however.

The example method 1200 may begin with the gathering of historical information 1202 concerning database connections that have been used by container instances. Such information may include, for example, when the connection was established/terminated, how long the connection was used, the container/instance that used the connection, and the database to which the connection was made. This historical information may be stored in a repository, and may be updated on an ongoing basis as containers use database connections to connect to databases.

The historical information may then be used to train 1204 an ML model of a prediction engine. As the historical information is updated, the training 1204 may be performed on an ongoing basis. As a result of the training, the prediction engine may be able to predict, for a given container instance, the number of database connections expected to be needed by that container instance. Thus, when a container makes a request to connect to a database, the prediction may be used to ensure that adequate connections will be available for that container when needed. Note that in an embodiment, the connections are not reserved for the container, and can be used by another container if not then in use. Rather, the prediction may be used to provision a system to ensure that the system can provide all the connections actually needed by the containers in the system.

After the ML model has been trained 1204, an ambassador may be instantiated 1206 to facilitate the connection of instances of a container to one or more databases. In an embodiment, the instantiation 1206 may result in the ambassador receiving 1208, possibly automatically, from the prediction engine, one or more predictions as to the number of database connections expected to be needed by the containers in the system. Because the predictions may have been generated ahead of time, the prediction engine may not necessarily have to generate predictions after the ambassador has been instantiated 1206, although additional predictions may be generated the instantiation 1206, based on ongoing database connection requests by containers.

At some point, the ambassador may service 1210 a connection request received by the ambassador from a container. The connection request may identify, for example, the container/instance making the request, and the database to which access is requested. The servicing 1210 may comprise identifying whether a connection is available, and transmitting a connection object, corresponding to an available connection, to the requesting container. The container instance may then use the connection object to connect to the database identified in the request.

When the container object has been sent, the ambassador may update a cache 1212 to indicate that the connection is no longer available, due to its use by the requesting container. The update 1212 may also identify the container, the connected database, and a timestamp indicating when the connection was made.

When the container is finished with the connection, the connection may be terminated 1214 so that it can be used by another container. After termination 1214, the cache may again be updated, this time to indicate that the connection is once again available for use.

F. Further Example Embodiments

Following are some further example embodiments of the invention. These are presented only by way of example and are not intended to limit the scope of the invention in any way.

Embodiment 1. A method, comprising: instantiating an ambassador component in a cloud computing environment that comprises container instances and databases; accessing, by the ambassador component, a prediction as to a number of database connections expected to be used by a particular one of the container instances, and the prediction was generated by a prediction engine; receiving, by the ambassador component, a request from the particular container instance for access to one of the databases; and providing, by the ambassador component to the particular container instance from which the request for access was received, an access object usable by that particular container instance to use a database connection to access the database identified in the request.

Embodiment 2. The method as recited in any preceding embodiment, wherein the prediction engine was trained using historical data about the particular container instance and the database, or databases, to which that particular container instance previously connected.

Embodiment 3. The method as recited in any preceding embodiment, wherein none of the database connections is reserved for any of the container instances.

Embodiment 4. The method as recited in any preceding embodiment, wherein the database connections reside in a cache and a record in the cache is updated when the ambassador component provides the access object to the particular container instance, and the record is also updated when the database connection used by the particular container instance is terminated.

Embodiment 5. The method as recited in any preceding embodiment, wherein any of the database connections that is inactive is available to any of the container instances.

Embodiment 6. The method as recited in any preceding embodiment, wherein the prediction engine comprises a single-output dense artificial neural network that was used to generate the prediction.

Embodiment 7. The method as recited in any preceding embodiment, wherein the ambassador component uses the prediction to determine which of the database connections the access object is generated for.

Embodiment 8. The method as recited in any preceding embodiment, wherein information about the particular container instance, and the database connection used by that particular container instance, is stored in a historical metrics repository that is accessible by the prediction engine.

Embodiment 9. The method as recited in any preceding embodiment, wherein the ambassador component keeps track of all open connections, to all databases, for all of the container instances.

Embodiment 10. The method as recited in any preceding embodiment, wherein when no database connections are available for the particular container instance, a new database connection is created, and the prediction engine updated.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 13:
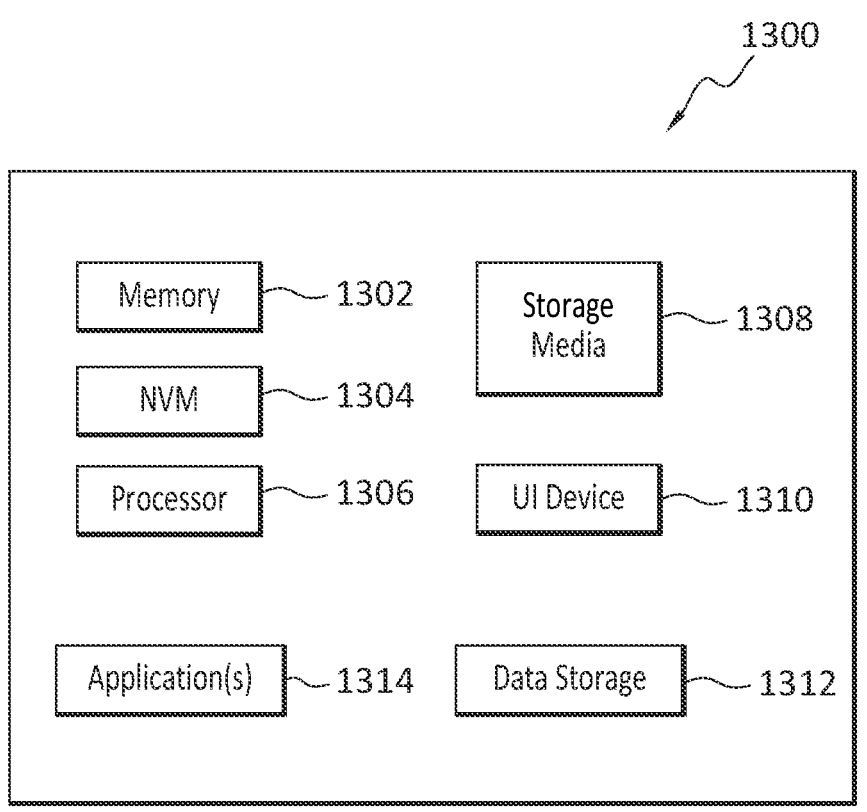
FIG. 13 discloses an example computing entity configured and operable to perform any of the disclosed methods, processes, and operations.

With reference briefly now to FIG. 13, any one or more of the entities disclosed, or implied, by FIGS. 1-12, and/or elsewhere herein, may take the form of, or include, or be implemented on, or hosted by, a physical computing device, one example of which is denoted at 1300. As well, where any of the aforementioned elements comprise or consist of a virtual machine (VM), that VM may constitute a virtualization of any combination of the physical components disclosed in FIG. 13.

In the example of FIG. 13, the physical computing device 1300 includes a memory 1302 which may include one, some, or all, of random access memory (RAM), non-volatile memory (NVM) 1304 such as NVRAM for example, read-only memory (ROM), and persistent memory, one or more hardware processors 1306, non-transitory storage media 1308, UI device 1310, and data storage 1312. One or more of the memory components 1302 of the physical computing device 1300 may take the form of solid state device (SSD) storage. As well, one or more applications 1314 may be provided that comprise instructions executable by one or more hardware processors 1306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   instantiating an ambassador component in a cloud computing environment that comprises container instances and databases;
   accessing, by the ambassador component, a prediction as to a number of database connections expected to be used by a particular one of the container instances, and the prediction was generated by a prediction engine;
   receiving, by the ambassador component, a request from the particular container instance for access to one of the databases; and
   providing, by the ambassador component to the particular container instance from which the request for access was received, an access object usable by that particular container instance to use a database connection to access the database identified in the request.

2. The method as recited in claim 1, wherein the prediction engine was trained using historical data about the particular container instance and the database, or databases, to which that particular container instance previously connected.

3. The method as recited in claim 1, wherein none of the database connections is reserved for any of the container instances.

4. The method as recited in claim 1, wherein the database connections reside in a cache and a record in the cache is updated when the ambassador component provides the access object to the particular container instance, and the record is also updated when the database connection used by the particular container instance is terminated.

5. The method as recited in claim 1, wherein any of the database connections that is inactive is available to any of the container instances.

6. The method as recited in claim 1, wherein the prediction engine comprises a single-output dense artificial neural network that was used to generate the prediction.

7. The method as recited in claim 1, wherein the ambassador component uses the prediction to determine which of the database connections the access object is generated for.

8. The method as recited in claim 1, wherein information about the particular container instance, and the database connection used by that particular container instance, is stored in a historical metrics repository that is accessible by the prediction engine.

9. The method as recited in claim 1, wherein the ambassador component keeps track of all open connections, to all databases, for all of the container instances.

10. The method as recited in claim 1, wherein when no database connections are available for the particular container instance, a new database connection is created, and the prediction engine updated.

11. A non-transitory storage medium having stored therein instructions that are executable by one or more hardware processors to perform operations comprising:
   instantiating an ambassador component in a cloud computing environment that comprises container instances and databases;
   accessing, by the ambassador component, a prediction as to a number of database connections expected to be used by a particular one of the container instances, and the prediction was generated by a prediction engine;
   receiving, by the ambassador component, a request from the particular container instance for access to one of the databases; and
   providing, by the ambassador component to the particular container instance from which the request for access was received, an access object usable by that particular container instance to use a database connection to access the database identified in the request.

12. The non-transitory storage medium as recited in claim 11, wherein the prediction engine was trained using historical data about the particular container instance and the database, or databases, to which that particular container instance previously connected.

13. The non-transitory storage medium as recited in claim 11, wherein none of the database connections is reserved for any of the container instances.

14. The non-transitory storage medium as recited in claim 11, wherein the database connections reside in a cache and a record in the cache is updated when the ambassador component provides the access object to the particular container instance, and the record is also updated when the database connection used by the particular container instance is terminated.

15. The non-transitory storage medium as recited in claim 11, wherein any of the database connections that is inactive is available to any of the container instances.

16. The non-transitory storage medium as recited in claim 11, wherein the prediction engine comprises a single-output dense artificial neural network that was used to generate the prediction.

17. The non-transitory storage medium as recited in claim 11, wherein the ambassador component uses the prediction to determine which of the database connections the access object is generated for.

18. The non-transitory storage medium as recited in claim 11, wherein information about the particular container instance, and the database connection used by that particular container instance, is stored in a historical metrics repository that is accessible by the prediction engine.

19. The non-transitory storage medium as recited in claim 11, wherein the ambassador component keeps track of all open connections, to all databases, for all of the container instances.

20. The non-transitory storage medium as recited in claim 11, wherein when no database connections are available for the particular container instance, a new database connection is created, and the prediction engine updated.

\* \* \* \* \*